United States Patent [19]

Kwake

[11] 4,004,380
[45] Jan. 25, 1977

[54] DOUBLE WALLED INFLATABLE STRUCTURES

[76] Inventor: John P. Kwake, 2507 Carob Drive, Los Angeles, Calif. 90046

[22] Filed: July 8, 1974

[21] Appl. No.: 486,493

Related U.S. Application Data

[63] Continuation-in-part of Ser. No. 304,550, Nov. 7, 1972, abandoned.

[52] U.S. Cl. .......................................... 52/2; 52/1; 52/173 R; 126/271
[51] Int. Cl.² ........................................ E04B 1/345
[58] Field of Search .................. 126/270, 271; 52/2, 52/1, 173

[56] References Cited

UNITED STATES PATENTS

| | | | |
|---|---|---|---|
| 634,788 | 10/1849 | Young | 5/350 |
| 1,970,502 | 8/1934 | Hamza | 52/2 |
| 2,889,763 | 6/1959 | Pine | 98/31 |
| 2,990,837 | 7/1961 | Cashman | 52/2 |
| 3,042,050 | 7/1962 | Finlayson | 52/2 |
| 3,055,379 | 9/1962 | Fink | 52/2 |
| 3,346,978 | 10/1967 | Letsinger | 52/2 |
| 3,513,828 | 5/1970 | Masters | 126/271 |
| 3,526,199 | 9/1970 | Keats | 52/2 |
| 3,611,648 | 10/1971 | Barnett | 52/2 |
| 3,848,282 | 11/1974 | Viesturs | 52/349 |

FOREIGN PATENTS OR APPLICATIONS

| | | | |
|---|---|---|---|
| 53,573 | 2/1934 | Norway | 52/2 |

*Primary Examiner*—Ernest R. Purser
*Assistant Examiner*—Henry Raduazo
*Attorney, Agent, or Firm*—I. Morley Drucker

[57] ABSTRACT

This invention relates to an air supported double wall structure and a method of making same, including the preparation of a first and second plastic sheet; providing said plastic sheets with a multiplicity of predeterminedly located paired holes which determines the configuration of the final inflated structure; placing the plastic sheets opposite one another; mounting a multiplicity of grommeting means, provided with segments of cords, on the external surfaces of said plastic sheets over said holes; causing said segments of cords to extend inwardly through the holes between the plastic sheets; tying together in knots the loose ends of said cord segments, of the first sheet, with the corresponding loose ends of the cord segments of the second sheet; fusing the edges of the two sheets together; and blowing air into the thusly formed enclosure. An alternate method of securely maintaining the cords between the two plastic sheets is described, in which gaskets are placed adhesively against the internal surface of the plastic sheets covering the areas immediately surrounding the paired holes; segments of one-piece cords are caused to extend between and pass outwardly through said paired holes of the first and second plastic sheets, respectively; the ends of the cord segments are tied in knots to prevent their slipping back through the holes, and a washer is placed between the knots and the underlying outer sheet surface to prevent tearing of the holes. The externally situated knots or grommeting means are superposed by air tight covering means so as to prevent escape of air through the holes, in addition to improving the stability of the knots and the outward appearance of the plastic sheets.

The double-walled structure is ideally suited for the heating of fluids, such as air or water, by solar means. This is accomplished by connecting a hose or tube, carrying fluid from an appropriate source, to a plurality of elevated points within the double-wall structure. The fluid is then heated by solar means, as it falls, by gravity, to one or more exit points.

3 Claims, 15 Drawing Figures

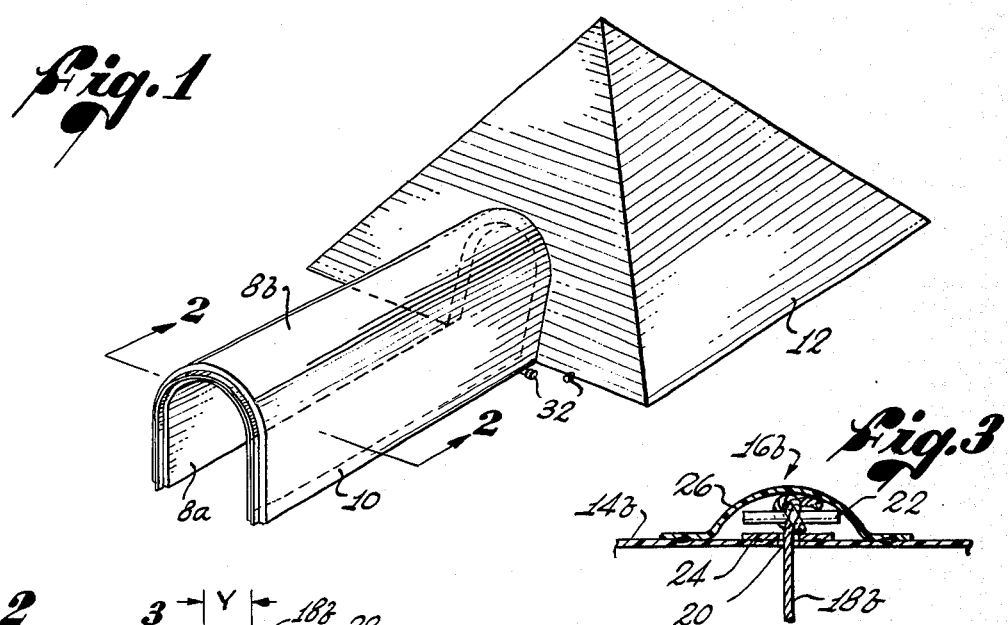
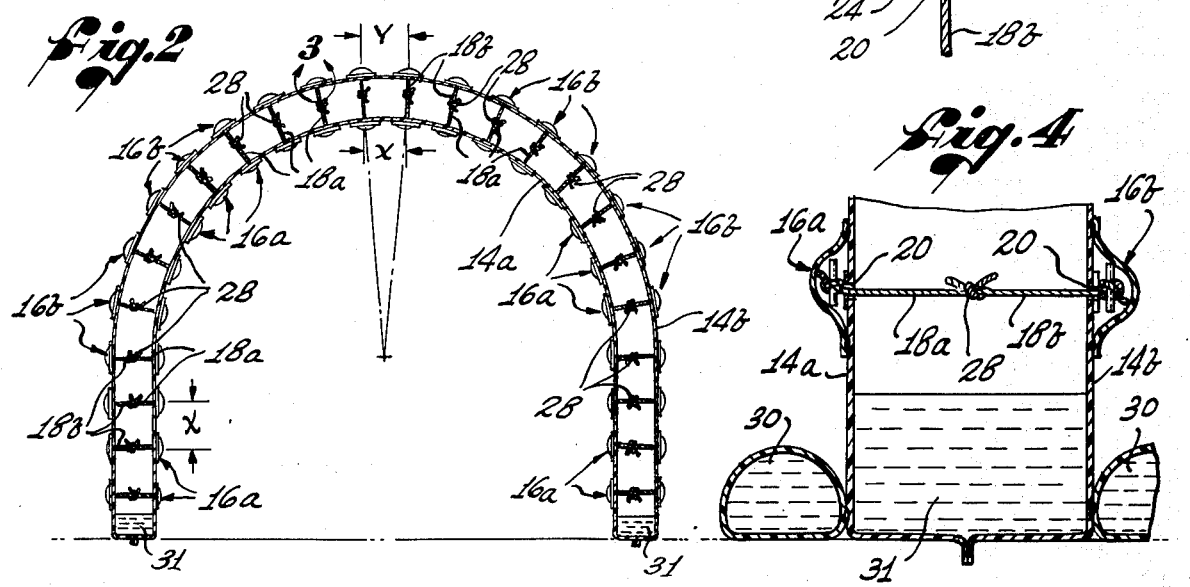
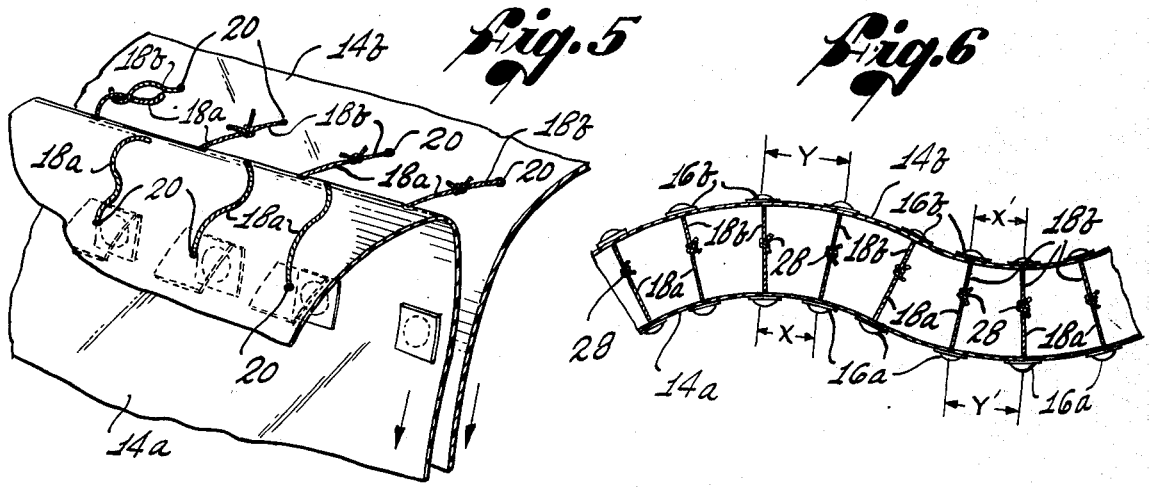

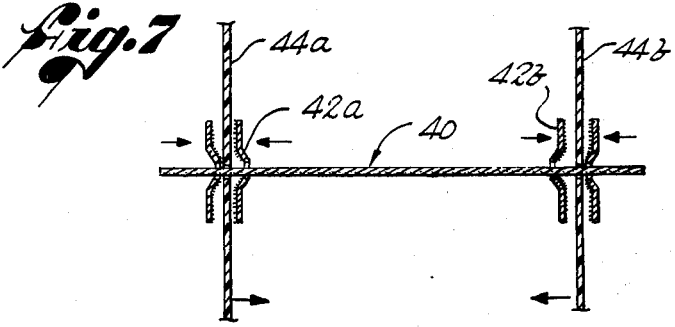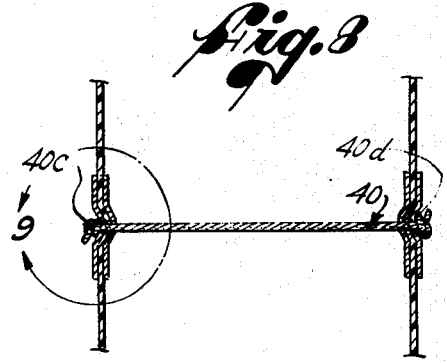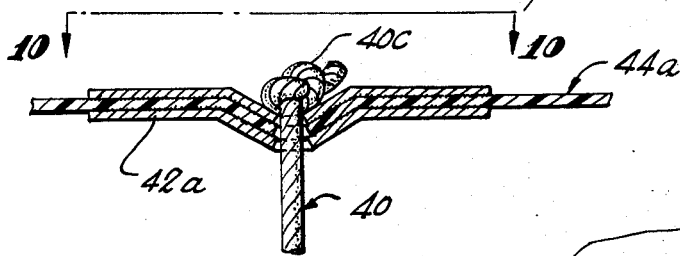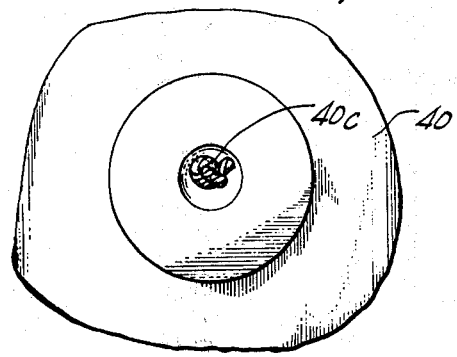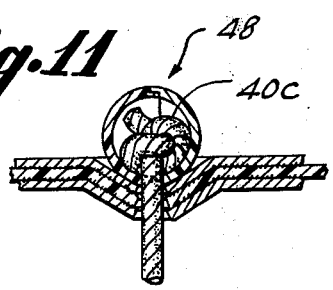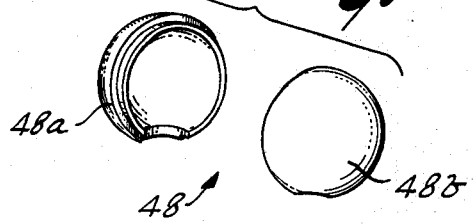

DOUBLE WALLED INFLATABLE STRUCTURES

This application is a continuation-in-part of my copending application Ser. No. 304,550 filed Nov. 7, 1972 and entitled DOUBLE-WALLED INFLATABLE STRUCTURE.

SUMMARY OF THE INVENTION

The method of constructing air supported double walled structure, as described herein, constitutes a novel approach to this particular art, in that the invented method may be carried out, at low cost, by average unskilled persons. The simplicity of the method appears from the few simple steps involved in erecting such structures, as per the invention.

More particularly, the invention concerns the method of constructing an air inflatable double-walled structure and the structure resulting therefrom, including the preparation of a first and second length of nylon reinforced vinyl sheets; punching a multiplicity of predeterminedly oppositely situated paired holes into the two sheets; causing a multiplicity of cord segments to pass through the holes of the first and second sheets respectively, one end of the respective cord segments being tied at the outer surfaces of the sheets around bearing or grommeting means, which are placed across the respective holes, so as to prevent the external portion of the cord strings from slipping back through the holes; mounting a plastic piece over the grommeting means and the underlying holes, constituting a seal so as to prevent escape of air therefrom; placing the plastic sheets in confronting position so that the holes to be paired will be adjacent to each other, tying the loose ends of the cord segments extending inwardly from the first plastic sheet, with the corresponding loose ends of the cord segments extending inwardly from the respective paired holes of the second sheet thereby structurally interconnecting the two plastic sheets; fusing, for example, by way of heat sealing, the edges of said plastic sheets together, so that the latter will form the completed enclosed structure; blowing air, by appropriate means, into the thusly formed enclosed structure, which then is ready to be placed securely, for example, by the use of conventional ballast means, on its site.

The invention describes an alternate method of securing the cord means to the plastic sheets by having the cord means extend, as a single piece, between the respectively paired holes of the two plastic sheets, thus eliminating the necessity of tying the loose ends of the cords in a center knot. Gaskets are placed adhesively against the internal surface of the plastic sheets over the areas immediately surrounding the paired holes for sealing purposes. The ends of the cords are caused to pass outwardly through the respective paired holes and are enlarged as by tying knots at the outer surface of the plastic sheets, to prevent the former from slipping inwardly through the respective holes. In order to prevent any tearing of the holes, a washer, preferably circular, is also placed between the externally situated knots of the cord segments and the surface of the plastic sheets. Furthermore, a split nut may be mounted over said external knots to improve the outward appearance of structure.

One of the major aspects of the invention lies in that the relative positions of any of the paired holes may be varied, predeterminedly, so as to vary the angles formed by the interconnecting cords and thereby the surfaces of the wall, and thus to be able to infinitely vary the configuration of the inflated structure to one's choice.

Another aspect of the invention resides in that this form of double-walled structure in combination with fluid supply means thereto, provides a simple, yet effective means of heating fluids supplied thereto, by solar energy.

The double-walled structure of this invention, which has an air space between a pair of plastic sheets, is found to be an excellent absorber of solar energy. If then, fluid is forced between the walls of the structure, into heat exchange contact with the air within the air space, heat transfer will readily take place whereby the fluid will be effectively heated. Since the interior of the air space in the structure of this invention is relatively unobstructed, having only cord-like elements contained therewithin for support, the fluid can pass readily downwardly over the interior surface of the structure to a low exit point.

Thus, an elongated fluid supply tube preferably runs the length of, and within, the structure, and is placed at a relatively elevated point in the double-wall structure. Fluid, e.g., water, is distributed by the supply tube, within one of the interior walls of the structure, and, as it falls downwardly along the interior walls, it picks up heat from the interior air space.

BACKGROUND OF THE INVENTION

The applicant calls attention to the following prior U.S. Letters Patent which are representable of the double-walled inflatable structure art:

| PATENTEE | PATENT NO. | ISSUE DATE |
| --- | --- | --- |
| Bird | 3,247,627 | April 26, 1966 |
| Blake et al. | 2,238,550 | April 5, 1941 |
| Berger | 654,430 | July 24, 1900 |
| Young | 634,788 | October 12, 1899 |

The Bird patent discloses an inflatable structure having a plurality of elongated webs which secure the opposite walls of the inflatable structure together; however, the webs serve to separate the structure into descrete compartmented areas and are very costly to manufacture.

Blake et al. discloses a watertight spaced mattress interconnecting fixedly arranged sheets secured by means of cords.

Young and Berger relate to air inflated mattresses with simple through-passing reinforcing cords.

None of the above listed references disclose an inflatable structure with a multiplicity of oppositely situated pairs of holes with cords, and holding means therefor, extending therefrom within the walled structure, said paired holes being disposed at predetermined locations in the walled areas of the structure, so as to permit any desired shape of structure when the latter is inflated.

The present invention relates to a double-walled inflatable air supported structure suitable for use as carports, hangars, swimming pool enclosures, outdoor exhibition halls and other type of temporary or auxiliary structures. Contrary to the known types of such structures, my invention is not limited to a predetermined configuration, such as an arch-shaped enclosure, or the like.

Thus, the primary object of the invention is to provide a method for the manufacture of a wide range of structural shapes, such as square, arched, and pyramidical enclosures, or any other desirable shape. This object is basically accomplished by the use of a multiplicity of oppositely situated holding or grommet means which are mounted at variable predetermined locations over a multiplicity of paired holes in the walls of the double walled inflatable structure and which secure a multiplicity of strings, cords or the like, extending through said holes therebetween so as to cause the double walls of the structure, when inflated, to be formed into a specific desired contour or shape.

It is a further object of the invention to provide an inexpensive and simple method of erecting such structures from partially prefabricated elements. The construction method is, in fact, so simple, that it can be carried out by unskilled workers.

DESCRIPTION OF THE DRAWINGS

FIG. 1 is a perspective view showing a combination of two differently shaped inflated structures;

FIG. 2 is a cross-sectional view of a tunnel shaped inflated structure taken on line 2—2 of FIG. 1;

FIG. 3 is a cross-sectional enlarged view of a grommet shown in FIG. 2, which serves as the holding means for the cord segments;

FIG. 4 shows a partial cross-sectional view of the bottom portion of the inflated structure, with the cord segments, tied in a center knot, extending between the holding means mounted on the paired holes;

FIG. 5 is a perspective view of two sheets showing the segments of cords to be tied together prior to the heat sealing of the sheets;

FIG. 6 is a cross-sectional view of a section of the walled structure, showing the variable angular positions of the tied cords extending between the paired grommeting means, which will determine the eventual contours of the structure;

FIG. 7 is an exploded cross-sectional view of a second embodiment of the holding means for the interconnecting cords of the walls, which span integrally the area between respective paired holes of the structure, thus eliminating the necessity of tying two cord segments together in a center knot within the two plastic sheets as shown in FIG. 4;

FIG. 8 is a cross-sectional view, as shown in FIG. 7, but in the assembled, final, state;

FIG. 9 is an enlarged view of a portion of FIG. 8;

FIG. 10 is a plan view of FIG. 9;

FIG. 11 is a view, in cross-section of the grommet means shown in FIG. 9, but with a split nut added to the knot;

FIG. 12 is a perspective view of the split nut shown in FIG. 11;

DESCRIPTION OF THE INVENTION

Figure 13:
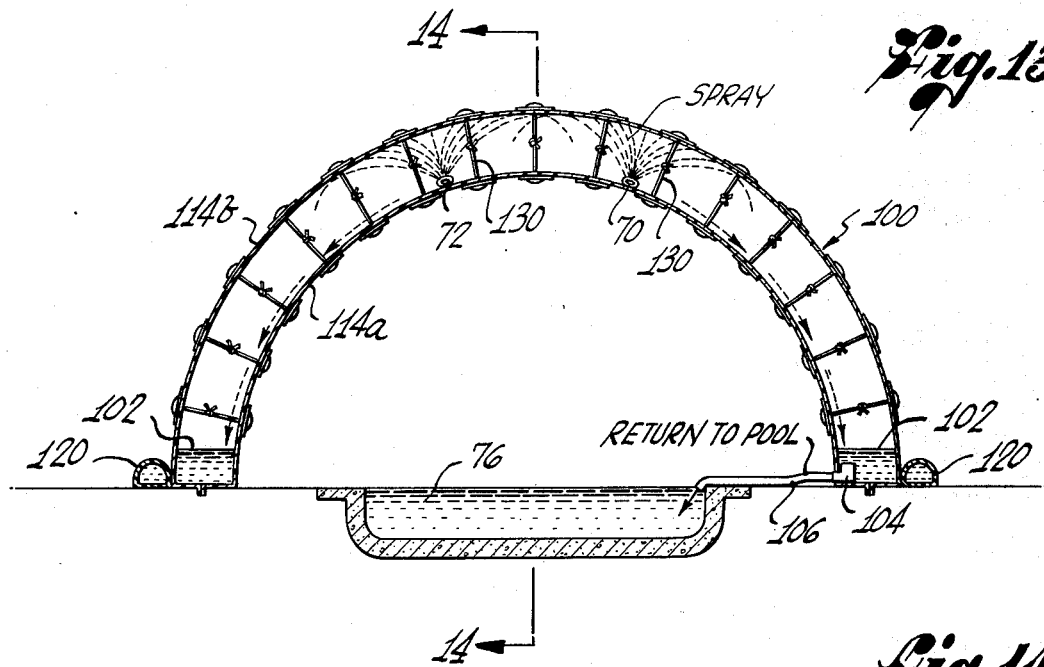
FIG. 13 is a cross-sectional view of the invention, as taken along the line 2—2, but showing a modification thereof for solar heating purposes.

Referring especially to FIGS. 1 and 2, the arched structure 10 and the pyramidical structure 12 represent two possibilities for manufacturing completely different outer shapes of such structures, from commercially available nylon reinforced vinyl sheets 14a, 14b (or unsupported vinyl sheets). As illustrated, the former structure serves as a tunnel shaped entrance to the latter. The variable shapes of these structures may be attained simply by spacedly varying the relative measured distances along the wall, between the paired grommeting means 16a, 16b and their interconnecting cords 18a, 18b, briefly referred to above.

The method of manufacturing such inflated air supported structures, as are seen in FIG. 1, is carried out by preparing two commercially available plastic sheets 14a, 14b which will form the double walls 8a and 8b of the structure. Several plastic sheets may be welded together to conform to any desired width and length of the structure. A multiplicity of holes 20 are punched at predetermined points into the sheets through which segments of cord 18a, 18b held by the grommeting means 16a, 16b will pass. As will be discussed in more detail further on, the location of these holes 20 of the plastic sheets 14a, 14b will determine the final shape of the inflated structure, for example, the shapes shown at 10 or 12. A multiplicity of paired grommeting means are mounted over the punched holes 20, as indicated on FIG. 2.

The grommeting means 16a, 16b, are seen in the enlarged view of FIG. 3, consists of a rod or bar 22 supporting and holding a cord 18b, preferably made of nylon, which is caused to pass through one of the punched holes 20 in the vinyl sheet 14b (or 14a). A preferably circular washer 24 is placed between the bar 22 and the underlying plastic sheet to avoid premature tearing of the latter caused by frictional contact between bar 22 and the plastic sheet 14b.

When the cord 18 has been securely attached to the bar 22, for example, by tying a simple knot (FIG. 3) or in any other manner, and caused to pass through the hole in the washer 24 and hole 20, the grommeting means 16b is covered and sealed in by means of a piece of vinyl plastic material 26, preferably disk shaped, which — once the completed double walls have been inflated with air — will prevent any air from escaping outwardly through any of the holes 20.

The loosely lying segments of cord 18 (FIG. 4) extending within the sheets 14a, 14b from each of the oppositely disposed paired grommeting means are then interconnected, for example, by tying a simple double knot 28, and, once the structure has been inflated, the cords 18a, 18b will extend tautly therebetween.

The cross-sectional view in FIG. 4 of the base portion of the arched structure 10 clearly shows one pair of the grommeting means 16, mounted on sheets 14a and 14b, and which hold the cords 18a, 18b in place, in taut fashion, once the double-walled structure has been inflated. All cords of the structure are held similarly taut after full inflation of the double wall structure of this invention.

FIG. 2 illustrates a multiplicity of cords 18a, 18b interconnecting the grommeting means 16a, 16b mounted at predetermined variable points on the walls 14a, 14b, respectively in the manner described above.

Subsequent to the mountings of the paired grommeting means 16a, 16b and the tying of the cords 18a, 18b, the edges of the sheets 14a, 14b are heat sealed airtight, thus completely enclosing the tied cords. A conventional blower and valve arrangement (not shown in detail on the drawings) admits air into the enclosure to be inflated. By means of the said conventional air blower designated 32 on FIG. 1, the sealed sheets 14a, 14b, are inflated to become a double walled air supported structure. As shown in FIG. 4, the erected structure, at its footing, may receive additional support from water filled ballasts 30 extending along the entire external lower portion of the structure. Furthermore, the lower portion of the structure itself may, by means of a simple heat sealing process, be transformed into a tube 31 to be filled with water for auxiliary support. Means other than the above described types of supporting or stabilizing means may be employed. For example, the structure may be kept stationary by means of ropes, attached thereto, which are tied or fixed to the grounds surrounding the structure.

In FIG. 5, the individual nylon reinforced vinyl sheets 14a, 14b, are placed in a confronting position for tying of the cord segments 18a, 18b and heat sealing of the edges of the sheets.

The edges of sheets 14, 14b, as shown in FIG. 5, are bent slightly outwardly to show the yet untied cord segments 18a, b, extending from the grommeting means, within the plastic sheets. The grommeting means 16a, 16b themselves are, as noted above, covered by airtight caps or seals 26, preferably in the form of small disks made of vinyl material.

FIG. 6 shows the relative position of a row of paired grommeting means 16a, 16b and the cords 18a, 18b interconnected by means of knots 28. As appears from the illustration, the pair of grommeting means 16a, 16b are mounted in variable, but predetermined positions so that the areas within any two interconnecting cords 18a, 18b held by the grommeting means appear like varying forms of truncated cones. The thusly variable angles which the cords 18a, 18b form with the walls 14a, 14b of the structure will determine the eventual configuration of the inflated walls.

The two oppositely located truncated cone forms, as indicated at Y, X, and $X^1$, $Y^1$ (FIG. 6) which are brought about by the different angular mounting of the cords, impart a serpent like appearance to the section. On the other hand, if all of the paired cord interconnected grommeting means were mounted right angularly to each other, i.e., equidistance from each other, the result would then be an air inflated rectangular structure, disregarding the fact that air inflated bodies tend to curve somewhat. (See base portion of FIG. 1). If the paired grommeting means 16a, 16b are spaced obliquely relative to one another, the obliquely extending interconnecting cords 18a, 18b will form different angles with respective surfaces 14a, 14b of the walls. To put it another way, if the distance between any two of the grommeting devices 16a, 16a mounted on wall 17a is greater than the distance between two grommeting devices 16b, 16b, (X') mounted substantially oppposite thereto on wall 14b, the interconnecting cords 18a, 18a, 18b, 18b, will form a truncated cone with the broader base (Y') thereof at wall 14a. If all the grommeting means were arranged similarly, a semicircular shape will be imparted to the structure.

Obviously, by delaying the change of, or gradually varying the spaced angular relation between the paired grommeting means of walls 14a, 14b, one would be capable of constructing almost any desirable shape of structures, portal, circular, rectangular, pyramidical, etc.

The mounting of paired rows of cord interconnecting grommeting means on the external inflated walls 14a, 14b, will impart a dimpled attractive appearance to the surface thereof. This effect is caused by the fact that the air which is blown into the double walled structure 10, 12 is maintained there at a pressure slightly above the ambient atmosphere, thereby causing the portions of the walls 14a, 14b between and around the rows of grommeting means to bulge outwardly.

The overall cord lengths 18a, 18b extending inwardly from the grommeting means (16a, 16b) are generally all of the same length regardless of the shape of the structure and may be from 6" to 20" in overall length.

FIGS. 7–12 illustrate an alternate method of mounting the cords between a double walled inflated structure, eliminating the use of the grommeting means of FIGS. 1–6 and the need for tying together in a center knot two cord segments extending from oppositely disposed grommeting means. As appears from FIG. 7, a one piece or unitary cord 40 on which is threaded two dished gaskets 42a, 42b, extends between the double walls 44a, 44b. The ends 40a, 40b, of the cord 40 passes outwardly through the holes 46a, 46b of double walls 44a, 44b, respectively, and are tied there in knots 40c, 40d, to prevent the cord ends 40a, 40b from slipping back into the structure. The cord ends could be enlarged by means other than by knotting as well. The gaskets 42a, 42b are pressed against the plastic sheet walls and are held there firmly, for example, by liquid adhesive, thus contributing to rendering the holes 46 airtight. Washers 50a, 50b, preferably circular, are interposed between knots 40c, 40d and the outer plastic walls 44a, 44b to prevent tearing of holes 46a, 46b and their surrounding wall areas. Nuts 48, comprising split portions 48a, 48b, are then mounted over the externally situated knots 40c, 40d, and holes 46a, 46b, primarily to effectively prevent the escape of air from the inflated structure, and secondarily, to improve the outward appearance thereof.

Another aspect of the invention resides in that this form of double-walled structure in combination with fluid supply means thereto, provides a simple yet effective, means of heating fluids supplied thereto, by solar energy.

The double-walled structure of this invention, which has an air space between a pair of plastic sheets, is found to be an excellent absorber of solar energy. If then, fluid is forced between the walls of the structure, into heat exchange contact with the air within the air space, heat transfer will readily take place whereby the fluid will be effectively heated. Since the interior of the air space in the structure of this invention is relatively unobstructed, having only cord-like elements contained therewithin for support, the fluid can pass readily downwardly over the interior surface of the structure to a low exit point.

Figure 14:
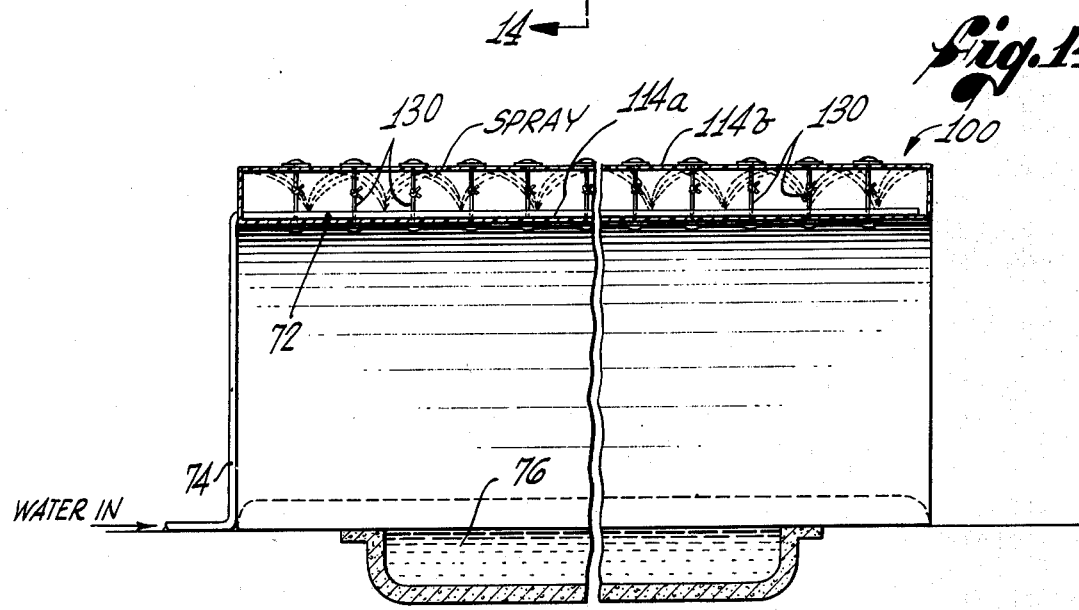
FIG. 14 is a cross-sectional view, taken along the line 14—14 of FIG. 13.
Figure 15:
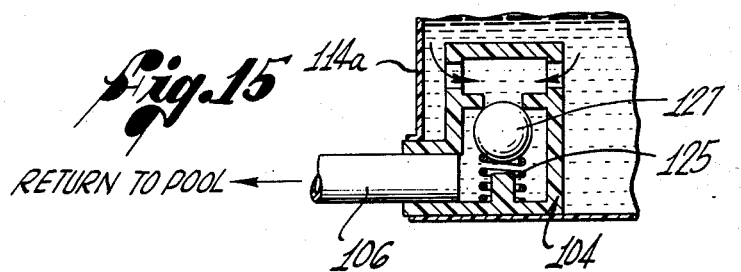
FIG. 15 is an enlarged cross-sectional view, of the ball check exit valve of FIG. 13.

Referring now to FIGS. 13–14, especially, elongated fluid supply tubes 70, 72 are placed in the double-walled inflated structure 100 at a relatively elevated point in the structure and run preferably, substantially along the length of the enclosure 100. The tubes 70, 72 are connected to an external fluid supply source, e.g., from a swimming pool 76, via pipe 74.

Water entering tubes 70, 72 is preferably distributed, in a spray pattern, within the double walls 114a, 114b of the enclosure 100. The water, in spray form, thus readily picks up heat absorbed within the air space by solar energy. The heated water falls, by gravity, into a reservoir 102 at the bottom of the enclosure 100 where it can exit, via a ball check valve system 104 and exit line or pipe 106, into the pool 76 or can be sent elsewhere for other heating purposes.

The ball check valve system 104 opens in response to the water level in reservoir 102. As the water level in reservoir 102 overcomes the pressure exerted by spring 125, the ball 127 unseats and allows water to flow out from enclosure 100, via line 106.

The ball check valve system 104 could also be made temperature-responsive, if desired, and openable only when the temperature of the water in the pool 76 was below a desired point. Temperature responsive valve means is not shown but is conventional in the art.

The enclosure 100 is inflated, as previously described with reference to enclosure 10, and a water ballast system 120 is utilized comparable to water ballast 30 of enclosure 10.

The walls 114a, 114b are made of plastic, the outer wall 114b being translucent or non-opaque, and are interconnected by cord means 130, which cord means are substantially of the same construction as has been previously described with reference to FIGS. 2–5. Since the structure 100 has only interior cord-like elements 130 contained therein, the water, being heated, has relatively unobstructed passage to the interior reservoir 102. Thus, the double-walled structure, 10, or 100, of this invention is ideally suited, in combination with a fluid supply and effluent means, as a solar water heater, as well as having the other advantages previously described. The fluid may be air or water.

The double-walled structure of this invention also serves as an efficient refrigeration space. Thus, if fluid, e.g., air or water, is circulated through the double walls 114a, 114b, as described with reference to FIGS. 13 and 14, which is at a lower temperature compared to ambient, and the outer wall 114b is heat-reflective, e.g., as by being painted with aluminized or heat-reflective paint, little heat will penetrate the air space between the double walls, and the coolant will efficiently reduce the temperature of the space enclosed by the structure 100. Thus, if the coolant temperature is at 60° F. and the ambient temperature is 100° F., it is readily possible to reduce the temperature of the interior of the structure 100 by 20° – 35° F. or more.

While the foregoing has illustrated and described what is now contemplated to be the best modes of carrying out the invention, the construction is, of course, subject to modifications, without departing from the spirit and scope of the invention. The invention is therefore intended to cover all modifications that may fall within the scope of the appended claims.

I claim:
1. A double walled inflatable enclosing structure, which comprises, in combination:
    a first reinforced plastic sheet;
    a second reinforced plastic sheet sealing attached to said first reinforced plastic sheet to form the roof and walls of said enclosing structure;
    means for internally interconnecting said first and second reinforced plastic sheets comprising:
        a. a plurality of individual, substantially non-stretchable, flexible, cord means,
        b. a plurality of pairs of holes provided in said first and second reinforced plastic sheets, each hole of a pair of holes being oppositely disposed in each of said first and second reinforced sheets at variable but predetermined distances from an adjacent pair of holes,
        c. the ends of each of said individual flexible cord means passing through each pair of holes and said ends being provided with enlarged ends so as to prevent their slipping inwardly through the holes whereby said plurality of cord means interconnects, and is supported entirely by, said first and second reinforced plastic sheets at the variable but predetermined distances from each other determined by the location of said plurality of said pairs of holes, and
        d. a plurality of washer means provided between the enlarged ends of each of said cord means and said first and second reinforced plastic sheets to prevent tearing of the underlying holes;
    means for air sealing said structure at areas adjacent the said enlarged ends of each of said cord means;
    an air blower means adapted to blow air into said enclosed structure and cause it to be inflated, said plurality of flexible cord means becoming taut and determining the configuration of said enclosed structure when said enclosed structure is fully inflated and said plurality of flexible cord means lying loosely within said enclosed structure when said enclosed structure is not inflated;
    fluid inlet means between said first and second reinforced plastic sheets, at at least one elevated point within said enclosing structure;
    fluid supply means connected to said fluid inlet means; and
    temperature-responsive valve means at a low point in said enclosure for permitting fluid, entering the fluid inlet means from said fluid supply means, to exit from said enclosing structure.

2. A double walled inflatable enclosing structure, which comprises, in combination:
    a first reinforced plastic sheet;
    a second reinforced plastic sheet sealingly attached to said first reinforced plastic sheet to form the roof and walls of an enclosed structure;
    means for internally interconnecting said first and second reinforced plastic sheets comprising:
        a. a plurality of individual, substantially non-stretchable, flexible, cord means,
        b. a plurality of pairs of holes provided in said first and second reinforced plastic sheets, each hole of a pair of holes being oppositely disposed in each of said first and second reinforced sheets at variable but predetermined distances from an adjacent pair of holes,
        c. the ends of each of said individual flexible cord means passing through each pair of holes and said ends being provided with enlarged ends so as to prevent their slipping inwardly through the holes whereby said plurality of cord means interconnects, and is supported entirely by, said first and second reinforced plastic sheets at the variable but predetermined distances from each other determined by the location of said plurality of said pairs of holes, and
        d. a plurality of washer means are provided between the enlarged ends of each of said cord means and said first and second reinforced plastic sheets to prevent tearing of the underlying holes;
    means for air sealing said structure at areas adjacent the said enlarged ends of each of said cord means;
    an air blower means adapted to blow air into said enclosed structure and cause it to be inflated, said plurality of flexible cord means becoming taut and determining the configuration of said enclosed structure when said enclosed structure is fully inflated and said plurality of flexible cord means lying loosely within said enclosed structure when said enclosed structure is not inflated;

fluid inlet means, having means for distributing water as small droplets, located between said first and second reinforced plastic sheets, at multiple elevated points, within the roof of said enclosed structure;

fluid supply means connected to said fluid inlet means; and valve means in said enclosed structure permitting fluid, entering the fluid inlet means from said fluid supply means, to exit, at a low point, from a wall of said enclosed structure whereby fluid is transported from the roof of said enclosed structure, throughout the air space formed between said roof and walls when said structure is inflated, to said low point of said enclosed structure.

3. A double walled inflatable enclosing structure, which comprises, in combination:

a first reinforced plastic sheet;

a second reinforced plastic sheet sealingly attached to said first reinforced plastic sheet to form the roof and walls of an enclosed structure;

means for internally interconnecting said first and second reinforced plastic sheets comprising:
  a. a plurality of individual, substantially non-stretchable, flexible, cord means,
  b. a plurality of pairs of holes provided in said first and second reinforced plastic sheets, each hole of a pair of holes being oppositely disposed in each of said first and second reinforced sheets at variable but predetermined distances from an adjacent pair of holes,
  c. the ends of each of said individual flexible cord means passing through each pair of holes and said ends being provided with enlarged ends so as to prevent their slipping inwardly through the holes whereby said plurality of cord means interconnects, and is supported entirely by, said first and second reinforced plastic sheets at the variable but predetermined distances from each other determined by the location of said plurality of said pairs of holes, and
  d. a plurality of washer means are provided between the enlarged ends of each of said cord means and said first and second reinforced plastic sheets to prevent tearing of the underlying holes;

means for air sealing said structure at areas adjacent the said enlarged ends of each of said cord means;

an air blower means adapted to blow air into said enclosed structure and cause it to be inflated, said plurality of flexible cord means becoming taut and determining the configuration of said enclosed structure when said enclosed structure is fully inflated and said plurality of flexible cord means lying loosely within said enclosed structure when said enclosed structure is not inflated;

fluid inlet means located between said first and second reinforced plastic sheets, at multiple elevated points, within the roof of said enclosing structure;

fluid supply means connected to said fluid inlet means; and pressure responsive valve means in said enclosed structure permitting fluid, entering the fluid inlet means from said fluid supply means, to exit, at a low point, from a wall of said enclosed structure whereby fluid is transported from the roof of said enclosed structure, throughout the air space formed between said roof and walls when said structure is inflated, to said low point of said enclosed structure.

* * * * *